United States Patent
Rajgopal et al.

(10) Patent No.: US 11,455,107 B2
(45) Date of Patent: Sep. 27, 2022

(54) MANAGING SEQUENTIAL WRITE PERFORMANCE CONSISTENCY FOR MEMORY DEVICES

(71) Applicant: Micron Technology, Inc., Boise, ID (US)

(72) Inventors: Suresh Rajgopal, San Diego, CA (US); Ling Wang, Shanghai (CN); Yue Wei, Shanghai (CN); Vamsi Pavan Rayaprolu, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/666,351

(22) Filed: Oct. 28, 2019

(65) Prior Publication Data

US 2021/0096755 A1    Apr. 1, 2021

(30) Foreign Application Priority Data

Sep. 27, 2019   (CN) ................ PCT/CN2019/108731

(51) Int. Cl.
*G06F 3/06* (2006.01)
(52) U.S. Cl.
CPC ........... *G06F 3/0632* (2013.01); *G06F 3/061* (2013.01); *G06F 3/0653* (2013.01); *G06F 3/0659* (2013.01); *G06F 3/0679* (2013.01)
(58) Field of Classification Search
CPC .... G06F 3/0679; G06F 3/0659; G06F 3/0653; G06F 3/0632; G06F 3/061; G06F 3/0658; G06F 3/0671; G06F 3/0613; G06F 3/0656; G06F 3/0688; G06F 2212/1016; G06F 2212/7203; G06F 2212/7202; G06F 12/0246; G06F 11/3419
See application file for complete search history.

(56) References Cited

U.S. PATENT DOCUMENTS

| | | | | |
|---|---|---|---|---|
| 5,799,324 | A  * | 8/1998 | McNutt | G06F 3/061 |
| 8,473,690 | B1 * | 6/2013 | Condict | G06F 12/0815 |
| | | | | 711/141 |
| 8,549,222 | B1 * | 10/2013 | Kleiman | G06F 3/0685 |
| | | | | 711/114 |

(Continued)

OTHER PUBLICATIONS

"Flash memory", Dec. 29, 2018, Wikipedia, as preserved by the Internet Archive on Dec. 29, 2019, pp. 1-22 http://web.archive.org/web/20181229065443/https://en.wikipedia.org/wiki/Flash_memory (Year: 2018).*

(Continued)

*Primary Examiner* — Reginald G Bragdon
*Assistant Examiner* — Curtis James Kortman
(74) *Attorney, Agent, or Firm* — Nicholson De Vos Webster & Elliott LLP

(57) ABSTRACT

A method is implemented for a memory sub-system that detects a sequential write pattern in a write sequence for a memory device in a set of commands received from a host, detects current bandwidth utilization deviating from a write bandwidth utilization performance target, in response to detecting the sequential write pattern, and adjusts write bandwidth utilization to conform to the write bandwidth utilization target, in response to detecting the current bandwidth utilization deviating from the write bandwidth utilization performance target.

11 Claims, 3 Drawing Sheets

(56) References Cited

U.S. PATENT DOCUMENTS

| | | | | |
|---|---|---|---|---|
| 8,812,744 | B1* | 8/2014 | Lyigun | G06F 3/064 |
| | | | | 710/5 |
| 9,798,497 | B1* | 10/2017 | Schick | H04L 67/1097 |
| 2004/0148484 | A1* | 7/2004 | Watanabe | G06F 3/0656 |
| | | | | 711/170 |
| 2012/0110247 | A1* | 5/2012 | Eleftheriou | G06F 12/0888 |
| | | | | 711/103 |
| 2016/0034354 | A1* | 2/2016 | Hashimoto | G06F 11/108 |
| | | | | 714/764 |
| 2018/0123931 | A1* | 5/2018 | Sun | H04L 43/16 |
| 2019/0101880 | A1* | 4/2019 | Guim Bernat | G06F 12/0813 |
| 2019/0114276 | A1* | 4/2019 | Hodes | G06F 3/0679 |
| 2019/0220416 | A1* | 7/2019 | Jung | G06F 12/1009 |
| 2020/0097183 | A1* | 3/2020 | Rawal | G06F 3/0659 |

OTHER PUBLICATIONS

Elisavet Kozyri, "Memory Paging", Summer 2016, Cornell University, Lecture 11 from the CS 4410 class presentation, slides 1-21 https://www.cs.cornell.edu/courses/cs4410/2016su/slides/lecture11.pdf (Year: 2016).*

* cited by examiner

MANAGING SEQUENTIAL WRITE PERFORMANCE CONSISTENCY FOR MEMORY DEVICES

CROSS-REFERENCE TO RELATED APPLICATIONS

This application claims the benefit of International Application No. PCT/CN2019/108731, filed Sep. 27, 2019, which is hereby incorporated by reference.

TECHNICAL FIELD

The present disclosure generally relates to managing performance for memory components, and more specifically, relates to managing consistency in write performance for memory components.

BACKGROUND ART

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
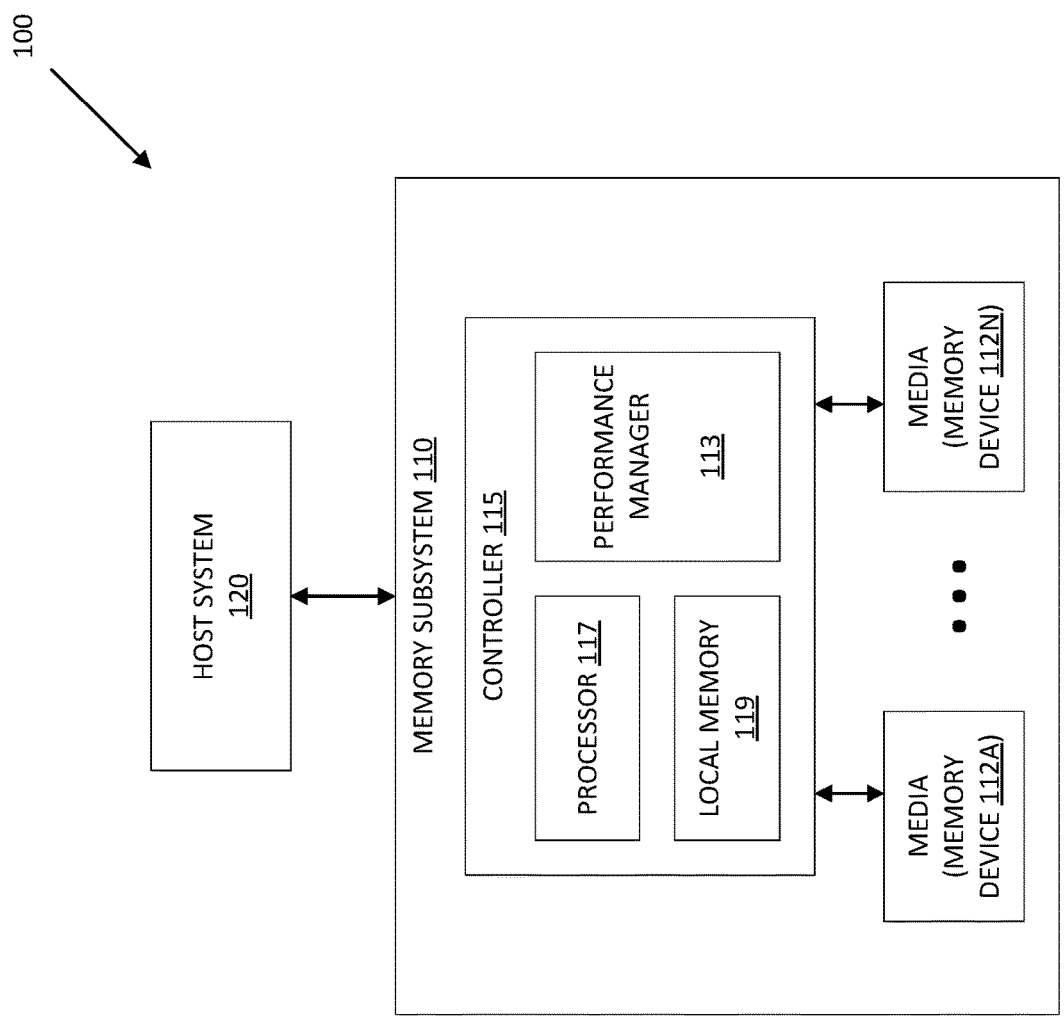
FIG. 1 illustrates an example computing environment that includes a memory sub-system in accordance with some embodiments of the present disclosure.

Aspects of the present disclosure are directed to managing sequential write performance to improve write performance consistency in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices. The memory devices can include, for example, non-volatile memory devices (e.g., negative-and (NAND) memory device). Other types of memory devices, including volatile memory devices, are described in greater detail below in conjunction with FIG. 1. The host system can provide data to be stored at the memory sub-system and can request data to be retrieved from the memory sub-system.

Memory sub-systems can consist of memory devices where information is stored. Memory devices, such as some types of non-volatile memory devices (e.g., NAND memory devices), can be structured as single-level cell (SLC), multi-level cell (MLC), triple-level cell (TLC), or quad-level cell (QLC). The various cell types store a corresponding number of bit(s) of information per cell.

Denser types of media, in particular QLC, can suffer from write performance variations. The media may experience longer programming times for write operations, in particular, sequential write operations (hereinafter referred to as a "sequential write"). A sequential write includes at least two host write commands that write data to contiguous physical spaces on a memory device and is described in greater detail below in conjunction with FIG. 1. Longer programming times associated with a sequential write can cause a noticeable downward performance spike, leading to inconsistent write performance. QLC has a behavior where the programming times between word lines can vary significantly, which contributes to inconsistent write performance.

Aspects of the present disclosure provide a scheme to overcome performance consistency issues by managing bandwidth utilization of the memory sub-system. A performance management process is utilized that identifies write patterns, e.g., long sequential writes, that are received from a host system that may be affected by performance variance in write bandwidth utilization. A long sequential write is defined as a sequential write that meets a threshold. The threshold can be a number of host write commands, e.g., as determined by the depth of the host queue or the duration for which the host write commands are sent and is described in greater detail below in conjunction with FIG. 1. A performance manager component implements the performance management process. The performance management process monitors the identified write patterns during execution to detect performance variance. Where the write performance deviates from a performance target, e.g., meeting or exceeding bandwidth threshold, the performance manager component adjusts (e.g., limits) bandwidth utilization. This bandwidth adjustment affects the write pattern by changing the write bandwidth utilization for the memory sub-system. The performance manager component does not adjust write bandwidth utilization for the memory sub-system associated with non-host initiated write operations that originate at the controller of the memory sub-system, such as write operations associated with garbage collection, error correction, and similar controller-initiated writes.

FIG. 1 illustrates an example computing environment 100 that includes a memory sub-system 110 in accordance with some embodiments of the present disclosure. The memory sub-system 110 can include media, such as memory devices 112A to 112N. The memory devices 112A to 112N can be volatile memory devices, non-volatile memory devices, or a combination of such. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory devices 112A to 112N when the memory sub-system 110 is coupled with the host system 120 by the PCIe interface. The physical host interface can provide an interface for passing control, address, data, and other signals between the memory sub-system 110 and the host system 120.

The memory devices 112A to 112N can include any combination of the different types of non-volatile memory devices and/or volatile memory devices. An example of non-volatile memory devices includes a negative-and (NAND) type flash memory. Each of the memory devices 112A to 112N can include one or more arrays of memory cells such as SLCs, MLCs, TLCs, or QLCs. In some embodiments, a particular memory device can include both an SLC portion and an MLC portion of memory cells. Each of the memory cells can store one or more bits of data (e.g., data blocks) used by the host system 120. Although non-volatile memory devices such as NAND type flash memory are described, the memory devices 112A to 112N can be based on any other type of memory such as a volatile memory. In some embodiments, the memory devices 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory devices 112A to 112N can be grouped as memory pages or data blocks that can refer to a unit of the memory device used to store data.

The memory system controller 115 (hereinafter referred to as "controller") can communicate with the memory devices 112A to 112N to perform operations such as reading data, writing data, or erasing data at the memory devices 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 115 can further include host interface circuitry to communicate with the host system 120 via the physical host interface. The host interface circuitry can convert the commands received from the host system into command instructions to access the memory devices 112A to 112N as well as convert responses associated with the memory devices 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 112A to 112N.

The memory sub-system 110 includes a performance manager component 113 that can improve write performance consistency for the host system 120. In some embodiments, the controller 115 includes at least a portion of the performance manager component 113. For example, the controller 115 can include a processor 117 (processing device) configured to execute instructions stored in local memory 119 for performing the operations described herein. In some embodiments, the performance manager component 113 is part of the host system 110, an application, or an operating system.

The performance manager component 113 can monitor commands received from the host system 120 to identify specific write patterns, e.g., long sequential writes. A sequential write includes at least two host write commands that write data to contiguous physical spaces on a memory device, described in greater detail in conjunction with FIG. 2. A long sequential write is distinguished from a sequential write by meeting a threshold, described in greater detail in conjunction with FIG. 2. The performance manager component 113 monitors the write bandwidth utilization of the identified write patterns and determines whether the write bandwidth utilization deviates from a bandwidth utilization performance target. If the performance manager component 113 detects the write bandwidth utilization deviating from the performance target, then the performance manager component 113 adjusts the write bandwidth utilization of the monitored write pattern. Further details with regards to the operations of the performance manager component 113 are described below.

Figure 2:
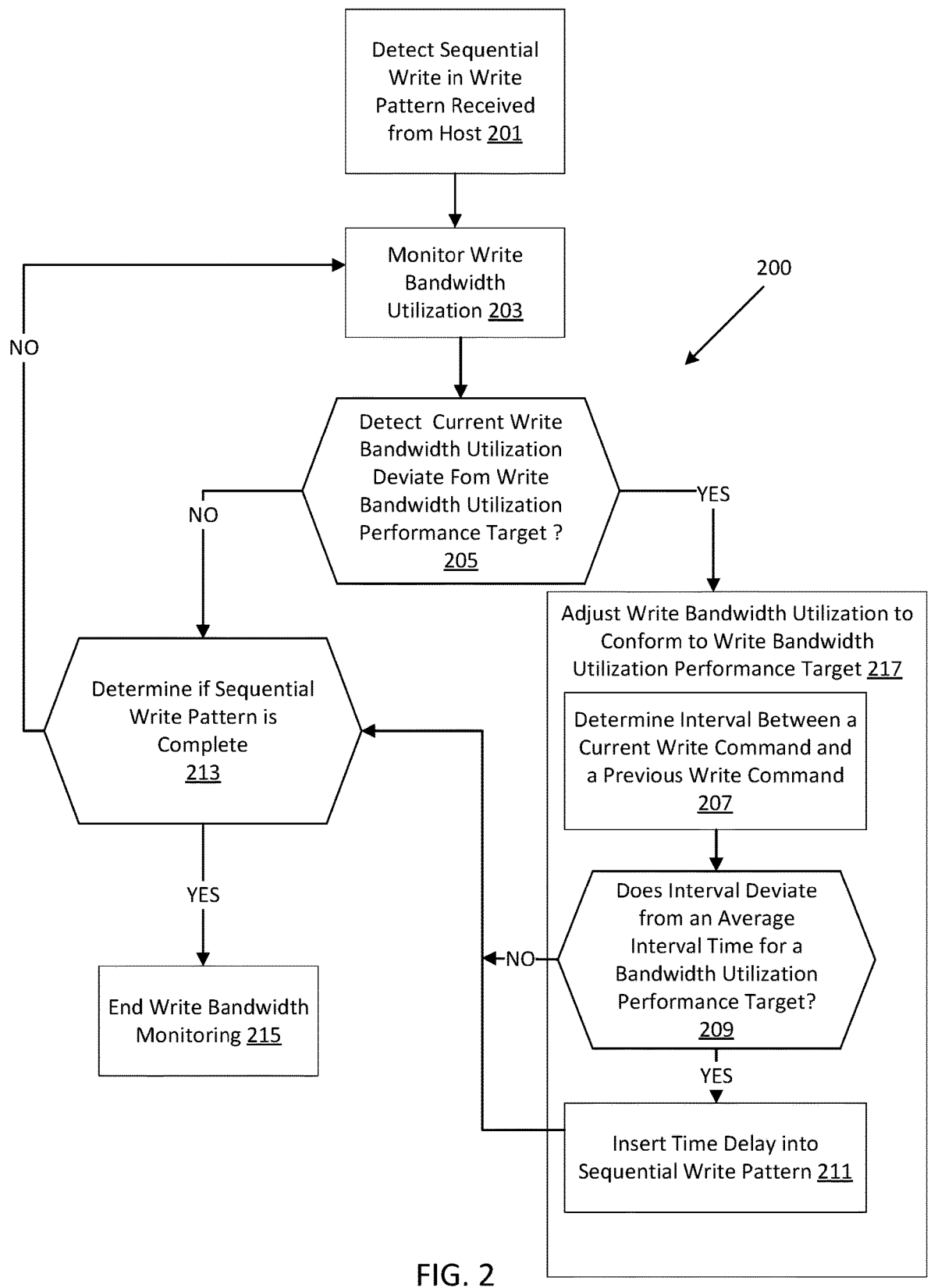
FIG. 2 is a flowchart of one example process for managing write performance consistency for memory devices in accordance with some embodiments of the present disclosure.

FIG. 2 is a flow diagram of an example write performance management method 200 to limit performance variance, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the performance manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 201, the processing device detects a sequential write in a set of commands (also referred to as a "write pattern") received from a host system. A "set" as used herein denotes a whole number of items, including one item. Each host write command includes the data to be written. In some embodiments, a write command also includes a logical address, which the processing device translates to a physical address of the memory device. The data is written to the corresponding location identified by the physical address. The data to be written can be a particular transfer size that is measured, for example, in kilobytes (KB). Examples of transfer sizes include, and are not limited to, 4 KB and 128 KB. Depending on the size of a page in the memory sub-system, the data to be written for a particular write command can fill one or more pages.

A sequential write includes at least two host write commands that write data to contiguous physical spaces on a memory device. The sequential physical spaces can be, for example, sequential pages of a block, sequential blocks, or a combination of such physical spaces in the memory devices of the memory sub-system. For example, a sequential write may include a first write command that writes data into pages within a block, such as page0 and page1 of block1. In this same example, the sequential write also includes a second write command that sequentially writes data into page2 and page3 of block1. In another example, a sequential write may include a first write command that writes data into page6 and page7 of block1, and a second write command that sequentially writes data into page0 and page1 of a sequential block (e.g., block2).

The processing device can monitor write commands that are received from the host system 120 and track the addresses for write commands in the received sequences of commands and/or the write commands themselves to identify a sequential write.

In some embodiments, the processing device identifies a specific write pattern, in particular, a long sequential write. A long sequential write is defined as a sequential write that meets a threshold. The threshold can be a number of host write commands or an amount of time. The number of host write commands for a threshold can be determined by the depth of the host queue. Each of the write commands in a long sequential write can write a segmented amount (e.g., 128 KB) of data in sequential nature to the memory sub-system. The amount of time for a threshold can be a duration for which the host write commands, which write a segmented amount (e.g., 128 KB) of data in sequential nature, are received. The threshold can be configurable and/or user or system defined.

In response to detecting the sequential write (e.g., a long sequential write), the processing device begins to monitor the write bandwidth utilization of the sequential write to the memory sub-system (Operation 203). For example, the processing device can track the write bandwidth utilization in a local memory 119 of the controller 115 or in a similar location. The processing device can track the write bandwidth utilization as a moving average of the bits written per second over a portion or the entirety of the detected sequential write pattern or using a similar metric. As this metric is updated with each write command processed by the controller 115, the processing device determines if the current write bandwidth utilization deviates from a write bandwidth utilization performance target (Operation 205). The performance target can be any bandwidth utilization value configured by a host system or user. Deviating from the performance target can be any degree or metric for detecting a difference between the performance target and the current bandwidth utilization.

If the processing device detects that the current bandwidth utilization deviates from the performance target, then the processing device adjusts the write bandwidth utilization for the memory sub-system (Operation 217). In one example embodiment, the write bandwidth utilization is adjusted by determining an interval between a current write command and a previous write command (Operation 207), where the interval can be calculated from receipt or completion of the write command. The interval can be measured in microseconds, clock oscillations, or similar timing metrics. The processing device checks if the determined interval deviates from (e.g., falls below) an average interval time for a bandwidth utilization performance target (Operation 209). In one embodiment, the processing device can utilize a static value for the average interval time. In other embodiments, the processing device tracks intervals and calculates average interval times. The bandwidth utilization performance target can be separate from or correlated with a bandwidth utilization threshold. In some embodiments, the bandwidth utilization performance target can represent a bandwidth utilization that has been configured to be the target for the performance manager component 113 such that the adjustments to the execution of the write commands are aimed at keeping the bandwidth utilization at or below the target.

In this example embodiment, if the processing device determines that the interval between the current write command and a previous write command is deviates from (e.g., falls below) the average interval time, the processing device inserts a delay into the sequential write pattern to increase the interval up to or exceeding the average interval time (Operation 211). For example, the performance manager component 113 can insert 'no operation' command (no op) (or similar commands that do not affect device state, but consume execution clock cycles inducing a defined delay in the device) into the sequential write pattern to create the intended delay in executing a current write command. The delay can be inserted into received commands at any point after performance target deviation is detected (e.g., by inserting a no op between segmented portions of a sequential write).

If the processing device determines that the current write bandwidth utilization does not meet the bandwidth utilization performance target (Operation 205), then the processing device determines if the sequential write pattern has completed (Operation 213). For example, the performance manager component 113 can detect the end of the sequential write pattern by identifying a next command that is received from the host system 120 as being any command other than a write command.

If the sequential write pattern has not completed, the processing device continues the monitoring of the write bandwidth utilization (Operation 203). If the sequential write pattern has completed, the processing device ends the monitoring of the write bandwidth utilization (Operation 215). The processing device can continue to monitor incoming commands from the host system 120 to identify the next sequential write pattern (Operation 201). The performance management process can continue during the operation of the memory device to manage performance variance for writes received from the host system. Since the performance management process manages bandwidth utilization of writes from the host system 120 and not writes that originate at the controller 115, the performance variance is managed while minimizing any interference on writes originating at the controller 115. In some cases, the writes originating from the controller 115 have increased write bandwidth availability due to the performance management process limiting the write bandwidth utilization of the host system 120.

Figure 3:
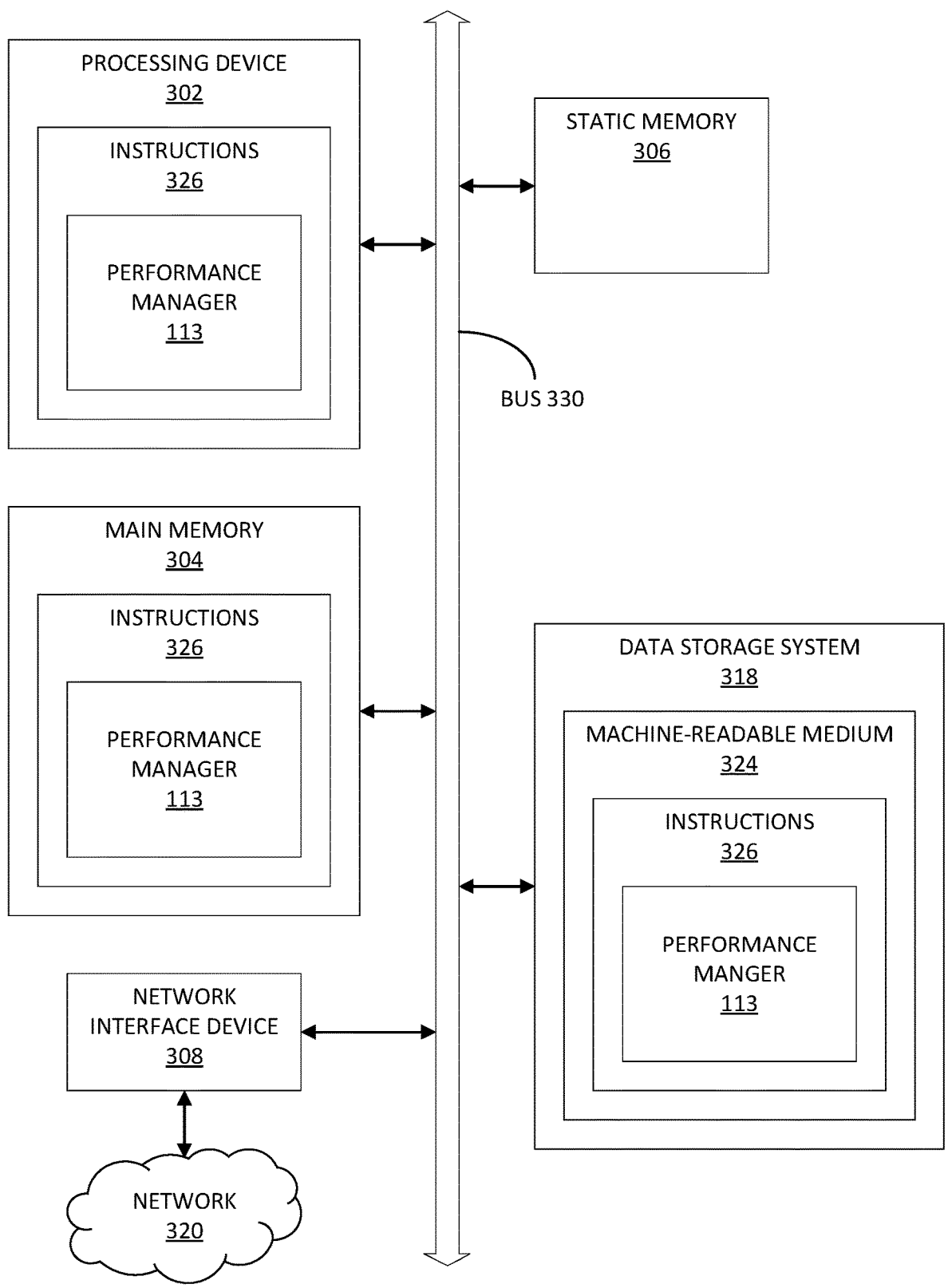
FIG. 3 is a block diagram of an example computer system in which embodiments of the present disclosure may operate.

FIG. 3 illustrates an example machine of a computer system 300 within which a set of instructions, for causing the machine to perform any one or more of the methodologies discussed herein, can be executed. In some embodiments, the computer system 300 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the performance manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage system 318, which communicate with each other via a bus 330.

Processing device 302 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 302 can also be one or more special-purpose processing devices such as an application specific integrated circuit (ASIC), a field programmable gate array (FPGA), a digital signal processor (DSP), network processor, or the like. The processing device 302 is configured to execute instructions 326 for performing the operations and steps discussed herein. The computer system 300 can further include a network interface device 308 to communicate over the network 320.

The data storage system 318 can include a machine-readable storage medium 324 (also known as a computer-readable medium) on which is stored one or more sets of instructions 326 or software embodying any one or more of the methodologies or functions described herein. The instructions 326 can also reside, completely or at least partially, within the main memory 304 and/or within the processing device 302 during execution thereof by the computer system 300, the main memory 304 and the processing device 302 also constituting machine-readable storage media. The machine-readable storage medium 324, data storage system 318, and/or main memory 304 can correspond to the memory sub-system 110 of FIG. 1.

In one embodiment, the instructions 326 include instructions to implement functionality corresponding to a performance manager component (e.g., the performance manager component 113 of FIG. 1). While the machine-readable storage medium 324 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. For example, a computer system or other data processing system, such as the controller 115, may carry out the computer-implemented method 200 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

receiving a set of commands from a host directed to a memory device;

detecting a long sequential write pattern in the set of commands received from the host, where each command in the set of commands includes a logical address that translates to a physical address of the memory device, where the long sequential write pattern is a sequence of write commands in the set of commands that writes to a contiguous physical space of the memory device and meets a threshold, where the threshold is based on a number of write commands in the sequence of write commands or where the threshold is an amount of time, and where the amount of time is a duration of time over which the set of commands is received; and in response to detecting the long sequential write pattern:

monitoring write bandwidth utilization;

detecting, in the monitored write bandwidth utilization, a current write bandwidth utilization of the long sequential write pattern, as written to the memory device, deviating from a write bandwidth utilization performance target for writing to the memory device; and adjusting the current write bandwidth utilization to conform to the write bandwidth utilization performance target in response to detecting the current write bandwidth utilization deviating from the write bandwidth utilization performance target, wherein adjusting the current write bandwidth utilization comprises:

determining an interval between a current write command in the set of commands and a previous write command;

determining whether the interval deviates from an average interval time for the write bandwidth utilization performance target; and limiting the current write bandwidth utilization by delaying execution of write commands in the sequence of write commands from the host, in response to the interval deviating from the average interval time for the write bandwidth utilization performance target.

2. The method of claim 1, wherein the execution of write commands from the host is delayed by inserting no operation commands into the sequence of write commands.

3. The method of claim 2, wherein the memory device is a quad-level cell NAND flash memory.

4. The method of claim 1, wherein detecting the current write bandwidth utilization deviating from the write bandwidth utilization performance target comprises: averaging intervals between write commands to determine whether the write bandwidth utilization performance target is exceeded.

5. A non-transitory computer-readable storage medium comprising instructions that, when executed by a processing device, cause the processing device to:

receive a set of commands from a host directed to a memory device;

detect a long sequential write pattern in the set of commands received from the host, where each command in the set of commands includes a logical address that translates to a physical address of the memory device, where the long sequential write pattern is a sequence of write commands in the set of commands that writes to a contiguous physical space of the memory device and meets a threshold, where the threshold is based on a number of write commands in the sequence of write commands or where the threshold is an amount of time, and where the amount of time is a duration of time over which the set of commands is received; and in response to detecting the long sequential write pattern:
monitor write bandwidth utilization;
detect, in the monitored write bandwidth utilization, a current write bandwidth utilization of the long sequential write pattern, as written to the memory device, deviating from a write bandwidth utilization performance target for writing to the memory device; and
adjust the current write bandwidth utilization to conform to the write bandwidth utilization performance target in response to detecting the current write bandwidth utilization deviating from the write bandwidth utilization performance target,
wherein adjusting the current write bandwidth utilization comprises:
determining an interval between a current write command in the set of commands and a previous write command;
determining whether the interval deviates from an average interval time for the write bandwidth utilization performance target; and
limiting the current write bandwidth utilization by delaying execution of write commands in the sequence of write commands from the host, in response to the interval deviating from the average interval time for the write bandwidth utilization performance target.

6. The non-transitory computer-readable medium of claim 5, wherein the execution of write commands from the host is delayed by inserting no operation commands into the sequence of write commands.

7. The non-transitory computer-readable medium of claim 6, wherein the memory device is a quad-level cell NAND flash memory.

8. The non-transitory computer-readable medium of claim 5, wherein detecting the current write bandwidth utilization deviating from the write bandwidth utilization performance target comprises:
averaging intervals between the write commands to determine whether the write bandwidth utilization performance target is exceeded.

9. A system comprising:
a plurality of memory devices; and
a controller, operatively coupled with the plurality of memory devices, the controller including a processor and a local memory, the processor configured to:
receive a set of commands from a host directed to a memory device of the plurality of memory devices;
detect a long sequential write pattern in the set of commands received from the host, where each command in the set of commands includes a logical address that translates to a physical address of the memory device, where the long sequential write pattern is a sequence of write commands in the set of commands that writes to a contiguous physical space of the memory device and meets a threshold, where the threshold is based on a number of write commands in the sequence of write commands or where the threshold is an amount of time, and where the amount of time is a duration of time over which the set of commands is received; and in response to detecting the long sequential write pattern:
monitor write bandwidth utilization;
detect, in the monitored write bandwidth utilization, a current write bandwidth utilization of the long sequential write pattern, as written to the memory device, deviating from a write bandwidth utilization performance target for writing to the memory device; and
adjust the current write bandwidth utilization to conform to the write bandwidth utilization performance target in response to detecting the current write bandwidth utilization deviating from the write bandwidth utilization performance target,
wherein adjusting the current write bandwidth utilization comprises:
determining an interval between a current write command in the set of commands and a previous write command;
determining whether the interval deviates from an average interval time for the write bandwidth utilization performance target; and
limiting the current write bandwidth utilization by delaying execution of write commands in the sequence of write commands from the host by inserting no operation commands into the sequence of write commands, in response to the interval deviating from the average interval time for the write bandwidth utilization performance target.

10. The system of claim 9, wherein the processor is further configured to:
average intervals between receipts or completions of the write commands to determine whether the write bandwidth utilization performance target is exceeded.

11. The system of claim 9, wherein each of the plurality of memory devices is a quad-level cell NAND flash memory.

* * * * *